(12) United States Patent
Koch et al.

(10) Patent No.: US 12,275,055 B2
(45) Date of Patent: Apr. 15, 2025

(54) PRODUCTION METHOD FOR A SHAPE-IMPARTING TOOL PART OF A FORMING TOOL

(71) Applicant: Ford Global Technologies, LLC, Dearborn, MI (US)

(72) Inventors: Raphael Koch, Odenthal (DE); Maik Broda, Würselen (DE); Ferat Oezkan, Übach-Palenberg (DE); Ilya Popov, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 769 days.

(21) Appl. No.: 17/377,959

(22) Filed: Jul. 16, 2021

(65) Prior Publication Data

US 2022/0016685 A1 Jan. 20, 2022

(30) Foreign Application Priority Data

Jul. 16, 2020 (DE) .......................... 102020118836.6

(51) Int. Cl.
*B21D 37/16* (2006.01)
*B21D 37/20* (2006.01)
(Continued)

(52) U.S. Cl.
CPC .............. *B21D 37/16* (2013.01); *B21D 37/20* (2013.01); *B22D 17/22* (2013.01); *B33Y 80/00* (2014.12)

(58) Field of Classification Search
CPC ........ B21D 37/16; B21D 37/20; B21D 37/01; B21D 22/02; B22D 17/22; B29C 64/112; B33Y 80/00; B33Y 10/00; B33Y 40/20; B22F 7/06; B22F 10/14; B22F 10/28; B22F 5/106; B22F 10/66; C21D 1/673; C21D 9/0062; C22F 1/002; C22F 1/04
(Continued)

(56) References Cited

U.S. PATENT DOCUMENTS

| | | |
|---|---|---|
| 1,329,559 A | 2/1920 | Tesla |
| 5,775,402 A * | 7/1998 | Sachs ...................... B22F 5/007 |
| | | 164/4.1 |

(Continued)

FOREIGN PATENT DOCUMENTS

| | | |
|---|---|---|
| GB | 2548629 | 9/2017 |
| WO | 2017142731 | 8/2017 |

OTHER PUBLICATIONS

Mueller, et al., Added Value in Tooling for Sheet Metal Forming through Additive Manufacturing, COMA '13 International Conference on Competitive Manufacturing, 7 pages.

(Continued)

*Primary Examiner* — Jessee R Roe
*Assistant Examiner* — Michael Aboagye
(74) *Attorney, Agent, or Firm* — Burris Law, PLLC

(57) ABSTRACT

A method of manufacturing a tool part of a forming tool. The method includes forming a tool element of the tool part having a shape-imparting operating face and at least one first cooling duct for cooling a liquid using an additive manufacturing machine. The first cooling duct has at least one rectifier portion including a blocking direction and an opposing passing direction. The blocking direction has a higher flow resistance to cooling liquid than the passing direction.

14 Claims, 5 Drawing Sheets

(51) Int. Cl.
*B22D 17/22* (2006.01)
*B33Y 80/00* (2015.01)

(58) Field of Classification Search
USPC ............... 266/130; 72/352, 342.3, 347, 446; 264/401; 164/6, 15
See application file for complete search history.

(56) References Cited

U.S. PATENT DOCUMENTS

| | | | |
|---|---|---|---|
| 7,261,550 B2* | 8/2007 | Herzog | B23K 26/34 425/552 |
| 10,697,035 B2* | 6/2020 | Sohmshetty | C21D 9/0062 |
| 11,673,177 B2* | 6/2023 | Saini | B28B 1/001 72/342.3 |
| 11,719,236 B2* | 8/2023 | Siebert | F16K 51/00 138/37 |
| 2013/0255346 A1* | 10/2013 | Danby | B33Y 10/00 72/352 |
| 2018/0236532 A1* | 8/2018 | Forsmark | B22F 5/10 |
| 2018/0354036 A1* | 12/2018 | Koch | B22D 27/04 |
| 2019/0100820 A1 | 4/2019 | Sohmshetty et al. | |

OTHER PUBLICATIONS

Mueller, et al., Added Value in Tooling for Sheet Metal Forming through Additive Manufacturing, Paper presented at the COMA '13 International Conference on Competitive Manufacturing, Jan. 2013, Stellenbosch, Germany, available at URL https://www.researchgate.net/publication/312164881_Added_Value_in_Tooling_for_Sheet_Metal_Forming_through_Additive_Manufacturing.

* cited by examiner

PRODUCTION METHOD FOR A SHAPE-IMPARTING TOOL PART OF A FORMING TOOL

CROSS-REFERENCE TO RELATED APPLICATIONS

This application claims priority to and the benefit of German Patent Application No. 102020118836.6, filed on Jul. 16, 2020. The disclosure of the above application is incorporated herein by reference.

FIELD

The present disclosure relates to a production method for a shape-imparting tool part of a forming tool.

BACKGROUND

The statements in this section merely provide background information related to the present disclosure and may not constitute prior art. Different method steps can be differentiated in the production of a formed sheet-metal part. One step relates to the actual forming of a blank or a semi-finished product to the desired shape. This forming can take place in one or more steps, whereby hot forming or cold forming is possible, as is known. Irrespective of the setting of a specific three-dimensional shape, setting of the microstructure is often also performed, in particular following hot forming. The workpiece here is cooled from a heated state (for example above the austenitizing temperature) according to a provided time/temperature profile. To this end, different methods are known depending on the type of the component and the desired microstructure. In general, targeted cooling results in a higher hardness, which is why reference is also made to hardening or tempering the workpiece.

Subsequent tempering in which the workpiece is retrieved from the forming tool, optionally reheated and finally cooled (for example quenched) is possible, on the one hand. In contrast, the hardening or tempering in the case of press hardening or hot stamping takes place within the forming tool, directly after or even during the forming. In order to achieve the desired cooling of the workpiece (for example a cooling rate of more than 27 K/s), the forming tool has to be efficiently cooled. This usually takes place by way of cooling ducts for a liquid coolant (for example water, optionally with additives). The cooling ducts here should ideally run at a specific, for example approximately constant, spacing from the shape-imparting surface. Cooling ducts which at least largely follow the contour of the shape-imparting surface can be referred to as shape-adapted or conforming cooling ducts. Since the profile of the shape-imparting surface is however generally complex, these cooling ducts can rarely be implemented by simple, straight bores. It is possible for the shape-imparting tool part to be integrally produced, on the one hand, wherein the profile of the cooling ducts is generally less than desired, this having a disadvantageous effect on the hardening procedure and the quality of the workpiece produced. On the other hand, the tool part can be assembled from a plurality of individual parts, wherein the cooling ducts in part are also configured between the individual parts. In principle, although arbitrary profiles of a cooling duct can be implemented here, the production complexity and thus the costs are being increased as a result of the construction mode having a plurality of individual parts. A possibility of implementing directional changes of a cooling duct within the tool part lies in cross-drilled holes, that is to say two straight holes which intersect within the tool part. The angled profile of the resultant cooling duct however is associated with increased friction; the production of such cross-drilled holes is moreover complex. We have discovered that the shape-imparting surface, like the cooling ducts, are usually at least in part produced by subtractive machining of the tool part. This is complex and associated with a lot of wear because the tool part has a particularly great hardness, the latter being desired in order to withstand loads during press hardening.

We have also discovered that producing conforming cooling ducts described here arises not only in the context of the press hardening but also in the context of other shape-imparting methods such as, for example, primary shaping methods such as aluminum diecasting or injection diecasting. Targeted temperature control, or cooling, of the produced workpiece within the forming tool is desirable also in the case of these methods.

U.S. Pub. No. 2019/0100820 A1 describes a hot stamping die comprising a body which has a forming face, cooling ducts within the body, and a heating element within the body, said heating element being separate and segregated from the ducts. The production can take place by configuring a die which has a forming face and while using printed inserts, which are configured for configuring cooling ducts, and a heating element within a solid material of the die. According to one form, the step of configuring the die comprises positioning of the printed inserts in a mold and subsequent primary shaping of a body of solid material so as to form a die.

WO 2017/142731 A1 describes a casting tool for metal parts, having an upper tool part and a lower tool part which therebetween formed a molding cavity. Each tool part has a shape-imparting face, and at least one of the tool parts has an insert as well as a sub-insert which form part of the shape-imparting face. The insert as well as the sub-insert can be retrieved from the tool part and replaced.

GB 2548629 A discloses a method for producing a mold insert for a casting tool, wherein a hybrid method which combines additive and subtractive manufacturing is used. The insert forms part of a cavity for generating a component with a desired geometry and has individually shaped segments, each of which being composed substantially of a structure of hexagonal cells which form an open honeycomb structure. Conforming cooling ducts are machined into the mold insert.

The production of a forming tool for press hardening by selective laser melting is described in the publication "Added Value in Tooling for Sheet Metal Forming through Additive Manufacturing", B. Mueller et al., Green Manufacturing for a Blue Planet: 30 Jan.-1 Feb. 2013, Stellenbosch; COMA 2013, p. 51-57. Here, conforming cooling ducts having a branched structure are machined into the forming tool.

In view of the prior art set forth, the suitable cooling of a shape-imparting tool part still offers room for improvement.

SUMMARY

This section provides a general summary of the disclosure and is not a comprehensive disclosure of its full scope or all of its features.

The present disclosure provides improved cooling of a shape-imparting tool part.

The present disclosure also provides a production method of manufacturing a tool part of a forming tool.

It is to be pointed out that features and measures which are individually set forth in the description hereunder can be combined with one another in any arbitrary, technically expedient manner and demonstrate further design variations of the present disclosure. The description additionally characterizes and specifies the disclosure, in particular in conjunction with the figures.

A production method for a shape-imparting tool part of a forming tool is made available by the present disclosure. The forming tool can in particular be a press hardening tool, thus a device which carries out hot forming of a metallic workpiece, usually a sheet-metal part, between two mold halves, as well as hardening or tempering which takes place simultaneously or subsequently to said hot forming. The latter desires that the workpiece has to be cooled within the press hardening tool. The two mold halves can also be referred to as a female die and a male die, and therebetween at least partially enclose the workpiece during the forming. To this end, at least one of the two mold halves is repositioned in the direction toward the other mold half. The hardening takes place while the workpiece is enclosed between the two mold halves. In this case, the shape-imparting tool part produced according to the disclosure forms at least part of one of the mold halves. In the context of the present disclosure, the forming tool can however also be configured for a primary shaping method such as injection diecasting or aluminum diecasting, for example.

According to the present disclosure, a tool element is produced by means of additive manufacturing, that is to say by means of an additive manufacturing method. An additive manufacturing method of this type can also be assigned to the field of rapid prototyping or rapid manufacturing, respectively. As will become evident hereunder, the tool element can be part of the tool part, or the tool element can be identical to the tool part. The tool element is usually produced from a metallic material. The production usually takes place in that a metallic powder is applied in layers and in regions is selectively connected. The three-dimensional tool element is created by connecting the individual layers to one another. Of course, the production process takes place based on predefined data (for example CAM data) of the object to be produced. Any pulverulent or particulate material which comprises at least one metal is referred to as a metallic powder here. This can also be an alloy or a mixture of particles of different metals. The powder can also contain semimetals or nonmetals, for example as a component part of an alloy. Copper, aluminum, titanium and iron can inter alia be considered as metals. Accordingly, a metallic material is a material which comprises at least one metal.

In order for the desired strength for the tool element to be produced, it is preferable that selective laser melting (SLM) or electron beam melting (EBM) or binder jetting is used as the additive manufacturing method. A metallic powder is applied in layers and selectively melted according to the envisaged three-dimensional shape here. An application device applies in each case a layer having a thickness of, for example, between 10 µm and 500 µm; other layer thicknesses are however also possible. In order to allow a smooth and uniform layer construction, the application device can have a smoothing device, for example a doctor blade, a brush or a knife which is moved parallel to the construction face and smooths the surface of the powder. After a respective layer has been applied, the powder in regions is fused by a laser beam (in the case of SLM) or an electron beam (in the case of EBM) and subsequently solidifies. A contiguous solid body is formed from the powder in this way. At the same time, the powder of the last added layer is fused with the solid body structures of the underlying layer or a plurality of underlying layers, as a result of which a mutual cohesion of the layers is established. As a function of inter alia the layer thickness it is possible that the material is fused down to a depth corresponding to a plurality of layer thicknesses. Alternatively or additionally to SLM or EBM, other manufacturing methods such as, for example, selective laser sintering (SLS) may be used.

The additively manufactured tool element has a forming region of which the surface in the finished state at least in portions forms a shape-imparting operating face of the tool part. The forming region here corresponds to an external region of the tool part to be produced, said external region at least in part being adjacent to the shape-imparting operating face. The operating face here is that part of the surface of the tool part that in the forming process (for example during press hardening) is in contact with the workpiece (or in a primary shaping process in contact with the initially shapeless raw material) and thus determines, or conjointly determines, the shaping. Other parts of the forming region here can directly or indirectly join the operating face. The shape-imparting operating face can be entirely or partially formed by the surface of the forming region. The forming region is additively manufactured, whereby the "finished state" is not necessarily present after the additive manufacturing has been completed. Rather, further machining or treating or the forming region can follow the additive manufacturing, as a result of which the exact shape or other characteristics of the surface may still be changed, for example.

Besides the forming region, the tool element has at least one first cooling duct for a cooling liquid. That is to say that the respective first cooling duct in the operation of the forming tool (for example in the context of the press hardening) is provided for directing a cooling liquid or a liquid coolant (usually water, optionally with additives). Of course, a plurality of first cooling ducts may also be provided. The region of the operating face can typically primarily be cooled by way of the at least one first cooling duct, and thus secondarily also the workpiece which is in contact with this region. In order for the desired cooling to be implemented, the first cooling duct at least in portions can run so as to be adjacent to the external wall, in particular adjacent to the operating face. Because the additive manufacturing allows almost arbitrary shaping, the first cooling duct can readily run at an arbitrary desired spacing from the operating face, even when the latter has a complicated shape. That is to say that a conforming cooling duct can also be readily implemented. Irrespective of the spacing from the operating face, the cooling duct can have a profile of the most varied type. In particular, curvatures of different types can be implemented, this being advantageous in terms of the flow resistance, while an angled profile usually increases the losses due to friction. The curvature can be a simple bend, for example a semicircle or a quadrant, or else a helical or meandering profile, for example.

According to the disclosure, at least one first cooling duct has a rectifier portion which in terms of a blocking direction has a higher flow resistance to cooling liquid than in terms of an opposing passing direction. The rectifier portion, which could also be referred to as a rectifier section, forms at least one part of a first cooling duct, optionally also an entire first cooling duct. The particularity of the rectifier portion lies in that the flow resistance thereof to the cooling liquid is a function of the flow direction. If the cooling liquid flows in a first direction, the latter here being referred to as the blocking direction, through the rectifier portion, said cooling liquid is imparted a higher flow resistance than when said cooling liquid flows in a second direction which is counter to said blocking direction and is referred to as the passing direction. The term "blocking direction" here is not to be interpreted to mean that the flow of the cooling liquid is completely blocked in this direction, while this nevertheless would be conceivable in the context of the present disclosure. However, at a pressure differential between the ends of the rectifier portion, which is equal in terms of value, the flow in the blocking direction is impeded such that a smaller volumetric flow is established in the blocking direction than in the passing direction. The volumetric flow in turn has an influence on the cooling effect on the surrounding material of the tool element. The cooling effect of a region which is adjacent to the rectifier portion can thus be influenced solely by the flow direction of the cooling liquid. For example, other first cooling ducts which do not have a rectifier portion of this type could be disposed therebeside, for example, as a result of which the volumetric flow and the cooling effect are independent of the flow direction. For example, either uniform cooling, or cooling which differs in local terms, can thus be implemented depending on the flow direction. As has already been mentioned, adapting the hardening profile to meet requirements can thus be achieved by adapting the cooling for the same component geometry. This is advantageous, for example, for different vehicle derivates or vehicle classes having different weights or requirements but the same component with the identical three-dimensional shape, without adapting the tool, or in the same tool, respectively. The respective rectifier portion can in particular have a Tesla valve, the fundamental construction thereof being described in U.S. Pat. No. 1,329,559 A, for example, the entire disclosure of which is incorporated herein by reference.

In some circumstances, the surface of the forming region after the additive manufacturing slightly deviates from the envisaged shape. This can be associated with the fact, for example, that no exactly smooth faces can be generated by a layered construction. It is also conceivable that thermal deformations of the tool element arise in the course of the additive manufacturing method such that said tool element is (slightly) distorted. In order to address potential inaccuracies, it can be provided that the surface of the forming region after of the additive manufacturing thereof is subtractively post-machined. The post-machining here can take place in a subtractive manner, for example by milling.

According to one form, at least one rectifier portion has a primary portion and a counterflow portion which is connected to said primary portion and, when viewed in the blocking direction, branches off from the primary portion at an angle of less than 90°, and opens into the primary portion again at an angle of more than 90° and thus in the opposite direction. That is to say that at least two portions can be differentiated within the rectifier portion, specifically the primary portion and the counterflow portion which branches off from the primary portion and also opens out again into the latter. The counterflow portion on both sides is fluidically connected to the primary portion. The rectifier portion overall thus has a branched structure. Viewing the profile of the primary portion in the blocking direction, the counterflow portion thus branches off from the primary portion at an angle of less than 90°, or one could also say at an acute angle. As a result thereof, it is facilitated that the cooling liquid when flowing through the rectifier portion in the blocking direction is split, so to say, such that one part flows through the primary portion while another portion flows into the counterflow portion. The cooling liquid flowing through the counterflow portion finally makes its way back into the primary portion, whereby the counterflow portion now however opens into the primary portion at an angle of more than 90°, or one could also say at an obtuse angle. The counterflow portion here usually has a change of direction such that said counterflow portion can be configured in the manner of a loop or arc, for example. The liquid when flowing through the counterflow portion in this instance is imparted an at least partial reversal of movement. In any case, the counterflow portion opens into the primary portion in the opposite direction, that is to say that a partial flow which follows the profile of the counterflow portion runs counter (thus at an angle of more than 90°) to a partial flow which follows the profile of the primary portion. Substantial turbulences, and thus a significant increase in the flow resistance, thus arise at the latest when the two partial flows meet one another. The profile of the partial flows in the primary portion and in the counterflow portion here is described in a simplified manner, and the actual flow profiles may deviate therefrom. In any case, the described profile of the counterflow portion leads to a significant increase in the flow resistance. The structure described here is implemented in the case of a Tesla valve. It is understood that the primary portion and the counterflow portion are produced by additive manufacturing. The effect can be markedly reinforced in that a plurality of counterflow portions along the primary portion are produced.

According to another form which can optionally be combined with the form described above, at least one rectifier portion has a primary portion, and at least one rigid guiding element which is inclined in the passing direction extends toward the center of the primary portion. The guiding element can be configured in the manner of guide vanes or guide blades. The function of said guiding element in the operating state lies in splitting the flow of coolant and partially redirecting the latter from the center of the primary portion to the outside when the rectifier portion is operated in the blocking direction. This in general leads to an increase in the flow resistance. When the rectifier portion is operated in the passing direction, the cooling liquid within the primary portion can however flow past the guiding element. This structure is also implemented in a Tesla valve, whereby one guiding element simultaneously forms in each case a periphery of a counterflow portion. It is understood that the guiding element is produced by additive manufacturing. The effect can be markedly reinforced in that a plurality of guiding elements along the primary portion are produced.

In the course of the additive manufacturing it is also possible, for example, for functional elements to be integrated in the tool element, said functional elements having been prefabricated independently of the additive manufacturing. Functional elements of this type can be, for example, sensors which are integrated in the tool part in this way. It is possible here for the tool element to be additively manufactured around the actual sensor such that the latter is enclosed, so to speak. Also conceivable, however, would be the integration of other functional elements such as, for example, a heating element or a valve element for a rectifier portion. The use of a temperature sensor would also be expedient, in particular by virtue of the temperatures being handled in the tool.

According to one form, a plurality of clearances within the tool element, which are spaced apart from each first cooling duct, can be generated by additive manufacturing. The function of these clearances can be, for example, in reducing weight or in saving material, for example. Moreover, however, these clearances can also serve for changing the thermal conductivity behavior of the tool element. It is understood that a region of the tool element that has clearances of this type has a lower thermal conductivity than a region of solid configuration. The thermal conductivity can even be set so as to be direction-dependent, for example by way of a honeycomb structure in which the clearances, and the walls configured therebetween, extend so as to be mutually parallel in one direction. The thermal conductivity in the corresponding direction in this instance is higher than transversely thereto. It is also possible for the clearances to be disposed only in regions below the shape-imparting operating face such that the thermal conductivity and thus the thermal transfer from or to the operating face is reduced in regions there.

The tool part under certain circumstances can be formed solely by the tool element, that is to say that the tool element and the tool part may be identical. According to another form, the tool part additionally to the tool element has a base element. In the course of the production method, the tool element can at least partially be inserted into a recess of a base element of the tool part, as a result of which at least one first cooling duct is fluidically connected to a second cooling duct configured within the base element. The base element in terms of volume or weight is generally configured so as to be larger than the tool element, but this is not necessarily the case. The base element has at least one second cooling duct which is of course likewise provided for receiving cooling liquid. The base element furthermore has a recess which is dimensioned in such a manner that said recess can at least partially receive the tool element. The interior dimensions of the recess can in particular be adapted to the external dimensions of the tool element. In the course of the production method, the tool element is at least partially inserted into the recess. The dimensions of the recess and of the tool element, and the position of the first cooling duct and the second cooling duct, are mutually adapted in such a manner that the first cooling duct, by being inserted, is fluidically connected to the second cooling duct, that is to say that the second cooling duct opens into the first cooling duct, or vice versa. In the operating state, cooling liquid can thus be exchanged between the first cooling duct and the second cooling duct. The most varied design variations are conceivable here. In particular, the base element can have two second cooling ducts which are connected to one another by a single first cooling duct. The second cooling ducts here can be disposed on the same side of the tool element, or on different sides, for example opposite sides. In the first case, the first cooling duct which connects the two second cooling ducts can be configured in the manner of a bend or a loop.

The base element at least in regions preferably forms the shape-imparting operating face of the tool part. That is to say that this shape-imparting operating face is partially formed by the tool element (specifically the external region of the latter) and partially by the base element. It is thus inter alia possible for the mechanical characteristics of the operating face per se, and optionally also the thermal conduction from and to the operating face, to be modified in regions in such a manner that the corresponding characteristics also differ in the case of the tool element and in the case of the base element. Moreover, it can be advantageous for the base element to be produced by a non-additive method, for example by primary shaping and subsequent subtractive machining, as a result of which parts of the shape-imparting operating face can be produced in a time-effective and cost-effective manner.

A modification or a repair of the base element can in particular be performed. In this case, the recess is generated by subtractive machining of the base element, wherein a portion of the base element that is subsequently replaced by the tool element is removed. That is to say that the base element, in certain circumstances per se, prior to the corresponding machining, was able to be used in a shape-imparting method. Either the fitness for use of said base element may be reduced by wear in the corresponding portion, or a modification, an upgrade so to speak, of the corresponding portion may simply be desired. For example, a greater hardness in the region of the operating face may be desired, or even a locally different geometry of the operating face. Both could be achieved by removing the portion (for example by drilling, milling, eroding or laser subtraction) and subsequently inserting the tool element. A different profile of a cooling duct within the corresponding portion may also be desired, for example in such a manner that the spacing of the cooling duct from the shape-imparting operating face is modified. The corresponding portion, having the cooling duct lying therein, can be removed as described, and the tool element having the first cooling duct designed as desired can subsequently be inserted. Of course, it would also be possible for a tool element to be inserted which in terms of shape and composition fully corresponds to the previously removed portion of the base element. The variant described here is considered to be an independent disclosure, even when the associated production method has the features of a shape-imparting tool part of a forming tool with a tool element having a forming region of which the surface in the finished state at least in portions forms a shape-imparting operating face of the tool part is produced by means of additive manufacturing, and having at least one first cooling duct for a cooling liquid, and without a first cooling duct having to have a rectifier portion.

At least one second cooling duct can preferably be produced by subtractive machining of the base element prior to the insertion of the tool element. That is to say, the generally more time-intensive and cost-intensive additive manufacturing can be dispensed with for producing this cooling duct, this overall potentially also applying to the base element. Instead, the base element can be cast, for example, and the second cooling duct can be subsequently produced by subtractive machining, in particular subtractive machining such as drilling. For example straight cooling ducts within an interconnected duct system can thus be implemented as second cooling ducts within the base element which have been produced in a subtractive manner, while, for example curved or angled, cooling ducts are implemented as first cooling ducts within the tool element which have been produced by additive manufacturing.

The additive manufacturing opens up the most varied possibilities. According to one form, the tool element is produced from a single material, for example a single metal. Alternatively however, it is also possible for different regions of the tool element to be produced from different materials. To this end, different metallic powders can be applied by a powder-bed method, for example, and be inherently fused or sintered, and fused or sintered to one another. This can be utilized in order to implement different surface characteristics such as, for example, an increased hardness or wear resistance in regions, on the one hand. Moreover, different materials having different thermal conductivities can be combined, for example. For example, a harder material albeit with a lower thermal conductivity, such as steel, could be used in the forming region, for example, while a less robust material but with a higher thermal conductivity, such as copper or brass, could be used in a region more remote from the operating face. The variant described here is considered to be an independent disclosure even when the associated production method has the features of the preamble of a shape-imparting tool part of a forming tool with a tool element having a forming region of which the surface in the finished state at least in portions forms a shape-imparting operating face of the tool part is produced by means of additive manufacturing, and having at least one first cooling duct for a cooling liquid, and without a first cooling duct having to have a rectifier portion.

According to one form, the tool element at least in the region of the operating face is made from a harder material than that of the base element. As a result thereof, a region which is heavily mechanically stressed in the forming method can be better protected against wear from the outset. On the other hand, it is also possible for a region suffering wear to be repaired as described above, so to speak, and to simultaneously be mechanically reinforced herein. The entire tool element here can be produced from a harder material than that of the base element, on the one hand. It would moreover be possible that only the forming region is produced from a harder material in the course of the additive manufacturing, for example. Finally, it would be possible that the surface of the forming region is provided with a coating which has an increased hardness. To the extent that a "harder material" is discussed here, this also includes the possibility that a harder microstructure is set without a different chemical composition having to be present, for example.

It is usually not possible to produce a materially integral connection between the tool element and the base element once said tool element has been inserted, for example. Fixing by pins and/or screws can be considered for this purpose. We have discovered that this results in implementing a liquid-tight connection in the transition region from the first cooling duct to the second cooling duct. According to one form, this is implemented in that a groove which surrounds a connecting opening that at the end of the first cooling duct is configured for connecting to a second cooling duct is produced in the additive manufacturing of the tool element, and an elastic sealing element is inserted into the groove prior to the insertion of the tool element into the recess. The connecting opening is an opening at the end of the first cooling duct and is disposed where the first cooling duct exits the tool element, or enters the latter, respectively. This connecting opening, when inserting the tool element into the base element, is disposed opposite a corresponding opening of the second cooling duct. In the course of the additive manufacturing, a groove which can be configured so as to be circular or oval, for example, is produced about this connecting opening. An elastic sealing element, for example an O-ring, is inserted into the groove prior to the insertion of the tool element. The dimensions of the groove and of the sealing element are adapted such that the sealing element is elastically deformed when the tool element is inserted into the recess. The sealing element here can at least partially move into the groove, to the extent that the dimensions of said sealing element permit this. The sealing element seals the transition region between the tool element and the base element in the region of the connecting opening such that a leakage of cooling liquid is ideally prevented audit at least reduced. The sealing element can be produced from a suitable material, for example a rubber-elastic material such as rubber or silicone. Because the groove is disposed in the region of the connecting opening, and thus in the region of the first cooling duct and the second cooling duct, no particularly high temperatures usually arise there during operation. Should thermal damage to the sealing element nevertheless exceptionally arise, said sealing element can be replaced without great complexity in that the tool element is removed from the recess and the damaged sealing element is retrieved from the groove and replaced by a new one. The variant described here is considered to be an independent disclosure, even when the associated production method has the features a shape-imparting tool part of a forming tool with a tool element having a forming region of which the surface in the finished state at least in portions forms a shape-imparting operating face of the tool part is produced by means of additive manufacturing, and having at least one first cooling duct for a cooling liquid, and without a first cooling duct having to have a rectifier portion.

The cross section of the groove can be selected in different ways, whereby the choice is of course also associated with the shape of the sealing element. The groove can in particular have an undercut cross section. The latter can be trapezoidal, for example, such that the groove has a width which reduces toward the surface of the tool element.

According to one form, the present disclosure provides a method of manufacturing a tool part of a forming tool. The method comprises forming a tool element of the tool part having a shape-imparting operating face and at least one first cooling duct for cooling a liquid using an additive manufacturing machine; forming a base element of the tool part having a recess and a second cooling duct using subtractive machining, and inserting the tool element into the recess of the base element such that the first cooling duct is fluidly connected to the second cooling duct. The second cooling duct is formed in the base element prior to inserting the tool element into the recess. The first cooling duct has at least one rectifier portion including a blocking direction and an opposing passing direction. Cooling liquid flowing through the first cooling duct in the blocking direction has a higher flow resistance than cooling liquid flowing through the cooling duct in the passing direction.

According to another form, the present disclosure provides a tool part of a forming tool. The tool part comprises a tool element having a shape-imparting operating face and at least one cooling duct for cooling a liquid. The tool element being an additive depositable material. The cooling duct has at least one rectifier portion including a blocking direction and an opposing passing direction. Cooling liquid flowing through the cooling duct in the blocking direction has a higher flow resistance than cooling liquid flowing through the cooling duct in the passing direction.

Further areas of applicability will become apparent from the description provided herein. It should be understood that the description and specific examples are intended for purposes of illustration only and are not intended to limit the scope of the present disclosure.

DRAWINGS

Further advantageous details and effects of the disclosure are explained in more detail hereunder by means of exemplary forms illustrated in the figures in which.

Figure 1:
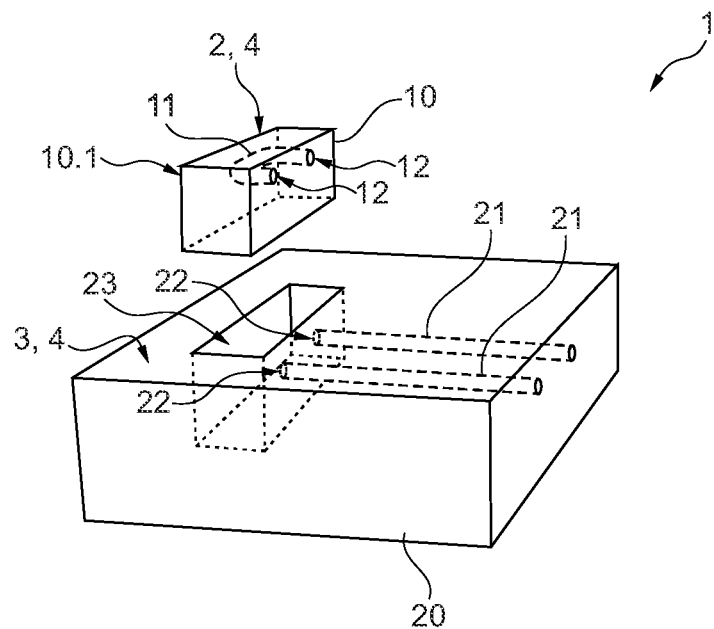
FIG. 1 shows a perspective view of parts of a tool part during a first step of a method according to a first form.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Identical parts are at all times provided with the same reference signs in the various figures, which is why said parts are typically also described only once.

FIG. 1 shows a perspective view of parts of a tool part 1 which can be produced by the method according to the present disclosure. The tool part 1 can form, for example, part of a female die or a male die of a press hardening tool (not illustrated). A sheet-metal part can be hot formed and hardened by means of the press hardening tool. The forming takes place inter alia on an operating face 4 of the tool part 1. FIG. 1 schematically shows an intermediate step of the production method, prior to a tool element 10 being joined to a base element 20. Both elements 10, 20 here are configured so as to be cuboid. This is however to be understood to be purely exemplary or schematic, for example.

The tool element 10 is produced from steel by additive manufacturing, for example by selective laser melting (SLM). A first cooling duct 11 which overall is configured so as to be bent and opens into two first connecting openings 12 has been generated in the course of the additive manufacturing. A surface 2 which in the finished state forms part of a shape-imparting operating face 4 of the tool part 1 is configured on a forming region 10.1 of the tool element 10. In order for the final shape of the surface 2 to be set, the latter at the end of the additive manufacturing can also be subtractively post-machined. Moreover, a hard coating, for example of tungsten carbide, could be applied.

The first cooling duct 11 in this exemplary form and in each of the exemplary forms described hereunder can have a rectifier portion 15 which will be explained in more detail with reference to FIGS. 13 to 16.

The base element 20 can be conventionally cast from tool steel, for example, and has two second cooling ducts 21 which are configured so as to be straight and may be drilled into the base element 20. The base element 20 furthermore has a cuboid recess 23 which can be molded directly when casting, for example, or else be subsequently shaped by subtractive machining such as by milling, for example. The dimensions of the recess 23 are adapted to those of the tool element 10 such that the latter can fit into the recess 23. The cooling ducts 21 open in each case into second connecting openings 22 on the periphery of the recess 23. A surface 3 of the base element 20 in the finished state likewise forms part of the shape-imparting operating face 4.

Figure 2:
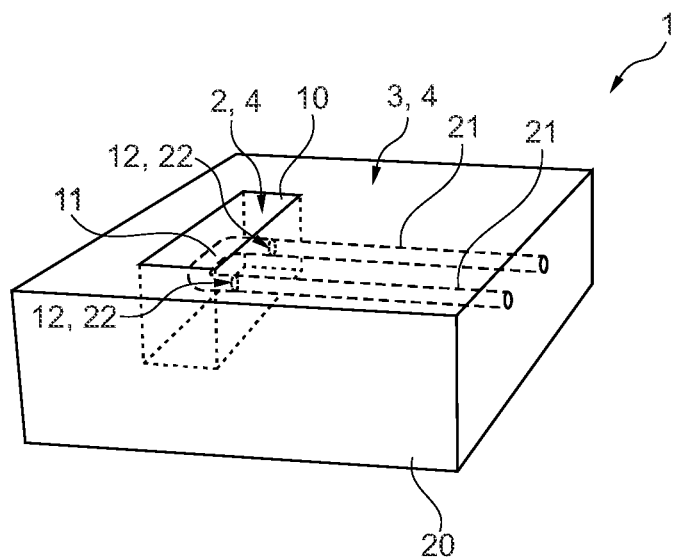
FIG. 2 shows a perspective view of the tool part from FIG. 1 during a second step of the method.

FIG. 2 shows the tool part 1 after the insertion of the tool element 10 into the recess 23 of the base element 20. The surface 2 of the tool element 10 transitions in a practically seamless manner to the surface 3 of the base element 20. The first connecting openings 12 are directly adjacent to the second connecting openings 22, as a result of which a fluidic connection between the cooling ducts 11, 21 is provided. More specifically, the two cooling ducts 21 are connected to one another by the bent first cooling duct 11, wherein the bent shape of the first cooling duct, which can be easily generated by the additive manufacturing, provides an improved flow resistance, as opposed to angled cooling ducts which can be generated by cross-drilled holes.

Figure 3:
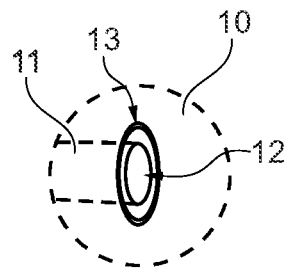
FIG. 3 shows an enlarged detailed view of FIG. 1.
Figure 4:
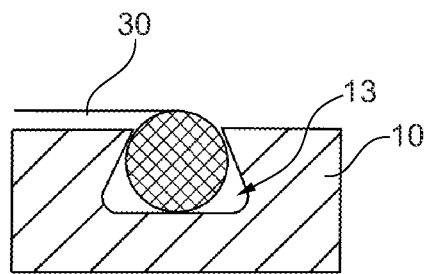
FIGS. 4 and 5 show enlarged cross-sectional views of the tool part from FIG. 1.
Figure 5:
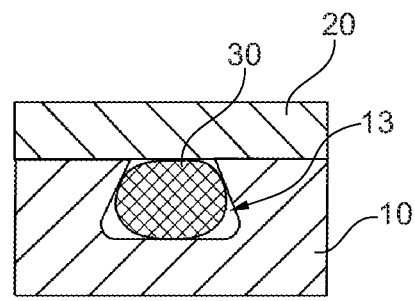

In order to improve a liquid-tight connection between the first cooling duct 11 and the second cooling ducts 21, sealing is provided by a rubber-elastic O-ring 30. The latter fits into an annular groove 13 which is disposed about the first connecting opening 12, as can be seen in the detailed illustration of FIG. 3. As is derived from the cross-sectional illustrations in FIGS. 4 and 5, the groove 13 has an undercut cross section and in terms of the dimensions of said groove 13 is adapted to the O-ring 30 such that the latter can first be jammed into the groove 13, as is illustrated in FIG. 4, and upon the insertion of the tool element 10 into the recess 23 is pushed into the groove 13 by the adjacent base element 20.

During a forming procedure, a sheet-metal part (for example after prior austenitizing) is formed between the tool part 1 and a further part of the press hardening tool (female die or male die). During the forming, or directly subsequently thereto, a cooling liquid (usually water, optionally with additives) is directed through the cooling ducts 11, 21 as a result of which intense cooling of the operating face 4 and thus also of the sheet-metal part takes place. The microstructure of the finished sheet-metal part is significantly influenced by this cooling. The cooling in turn can be influenced by various parameters, for example by the flow of coolant, the spacing of the cooling ducts 11, 21 from the operating face 4, and the thermal conduction within the tool element 10 and the base element 20. An individual design of the first cooling ducts 11 is possible as a result of the additive manufacturing, this having a direct influence on the microstructure in the region of the surface 2 of the tool element 10. In the example illustrated in FIGS. 1 and 2, the first cooling duct 11 runs at a constant spacing so as to be relatively close below the operating face 4. Other possibilities are however also provided, as will be illustrated hereunder.

Figure 6:
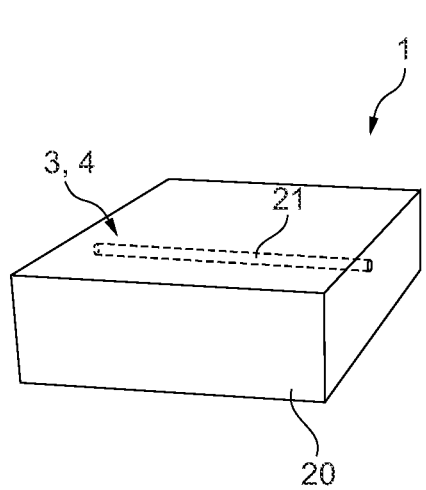
FIG. 6 shows a perspective view of part of a tool part during a first step of a method according to a second form.
Figure 7:
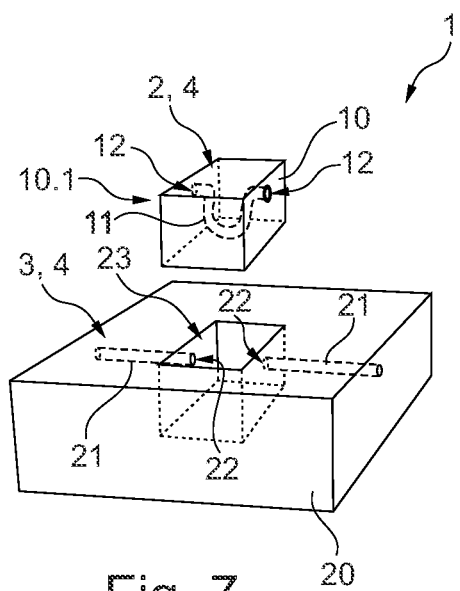
FIG. 7 shows a perspective view of parts of the tool part from FIG. 6 during a second step of the method.
Figure 8:
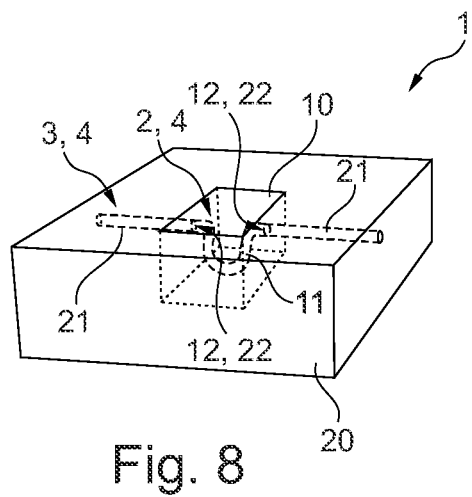
FIG. 8 shows a perspective view of the tool part from FIG. 6 during a third step of the method.

FIGS. 6 to 8 show method steps of a second form of the method according to the present disclosure. As is illustrated in FIG. 6, a base element 20 having a single second cooling duct 21 which is routed in a straight line is initially present here. The cooling duct 21 is drilled through the base element 20 and runs at a constant spacing from the surface 3. When the cooling characteristics are to be changed in a sub-region, a recess 23 can be generated by subtractive machining; that is to say that part of the base element 20 is removed as is illustrated in FIG. 7. As a result, the second cooling duct 21 is divided and second connecting openings 22 result on the periphery of the recess 23. A tool element 10 which matches the recess 23 and has a first cooling duct 11, the first connecting openings 12 of the latter being adapted to the second connecting openings 22, is produced by additive manufacturing, the first cooling duct 11 however does not having a straight profile which continuously runs close to the surface but being bent and partially running at a large spacing from the surface 2 of the tool element 10. As is illustrated in FIG. 8, the tool element 10 is inserted into the recess 23 so that the two parts of the second cooling duct 21 are connected to one another by the first cooling duct 11. By virtue of the larger spacing from the operating face 4, the cooling effect which is locally imparted by the first cooling duct 11 in terms of quality is inferior than that imparted by the parts of the second cooling duct 21. The tool element 10 can optionally be produced from a harder material than that of the base element 20.

Figure 9:
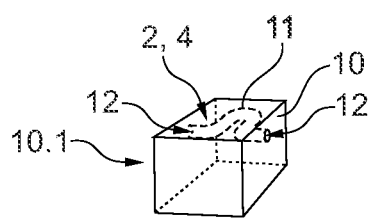
FIGS. 9 to 12 show perspective views of different forms of tool elements produced according to the present disclosure.

As an alternative to the tool element 10 illustrated in FIG. 7, other tool elements 10 can also be inserted into the recess 23. FIG. 9 in a perspective illustration shows an alternative tool element 10 having a first cooling duct 11 which likewise has a bent profile, but is disposed so as to run continuously at an almost constant spacing from the surface 2. No reduced cooling effect results in comparison to the continuous straight second cooling duct 21 which is illustrated in FIG. 6, but a cooling effect which under certain circumstances is even reinforced, because a larger face can be cooled by a single cooling duct 11. For the sake of simplicity, only one bend or a one loop of the first cooling duct 11 is illustrated in FIG. 7; in principle however, a plurality of successive loops could also be provided such that an overall meandering profile results.

Figure 10:
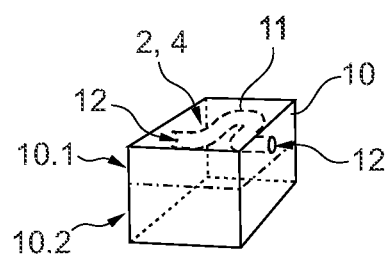

The exemplary form in FIG. 10 differs from that in FIG. 9 in that the forming region 10.1 is produced from iron or steel, while a line region 10.2 which in terms of the operating face 4 lies therebehind is produced from copper or a copper alloy. The different materials can be readily combined with one another in the course of an additive manufacturing method, for example in such a manner that different metallic powders are successively applied and fused in regions. In this way, the mechanical resilience of the iron and the high thermal conductivity of the copper can be advantageously combined in one tool element 10.

Figure 11:
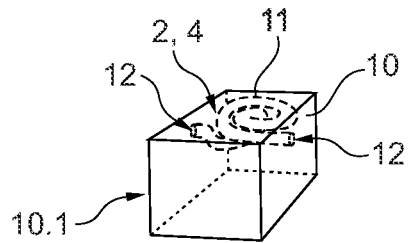

The exemplary form in FIG. 11 shows a first cooling duct 11 which is helically configured and, similar to that in FIG. 10, is disposed so as to be largely close to the operating face 4. The cooling effect on the operating face 4 and the workpiece to be formed can be increased by the helical shape, in a manner similar to a meandering shape.

Figure 12:
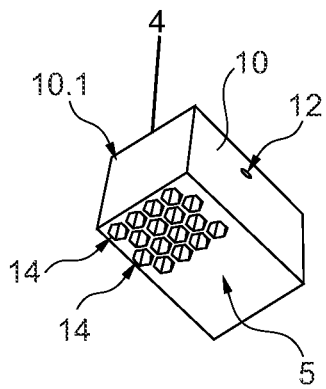

FIG. 12 shows another form of a tool element 10 which can have a first cooling duct (not shown) according to any of the previously mentioned exemplary forms. A lower face 5 lying opposite the operating face 4, and a plurality of clearances 14 which have been produced in the course of the additive manufacturing, can be seen in the perspective illustration of FIG. 12. In the example illustrated, said clearances 14 are configured so as to be hexagonal/prismatic and disposed in the manner of honeycombs. Material and weight can be saved as a result of the clearances 14, on the one hand; on the other hand, the thermal conductivity of the tool element 10 can be influenced in a targeted manner because said thermal conductivity is locally reduced as a result of the clearances 14.

As has already been mentioned above, the first cooling duct 11 in each of the exemplary forms shown can have a rectifier portion 15, the construction thereof being explained hereunder by means of FIGS. 13 to 16.

Figure 13:
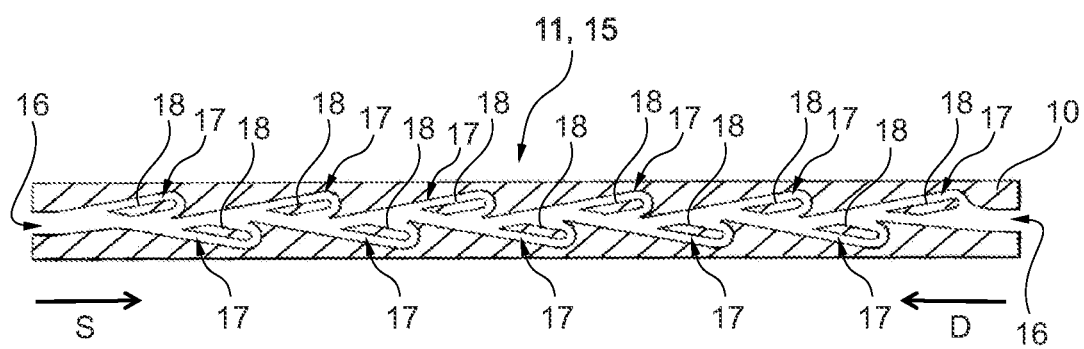
FIGS. 13-16 show cross-sectional views of a rectifier portion of a cooling duct of a tool part produced according to the present disclosure.
Figure 14:
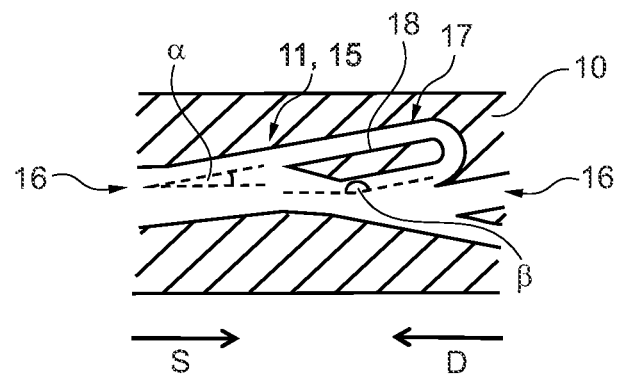
Figure 15:
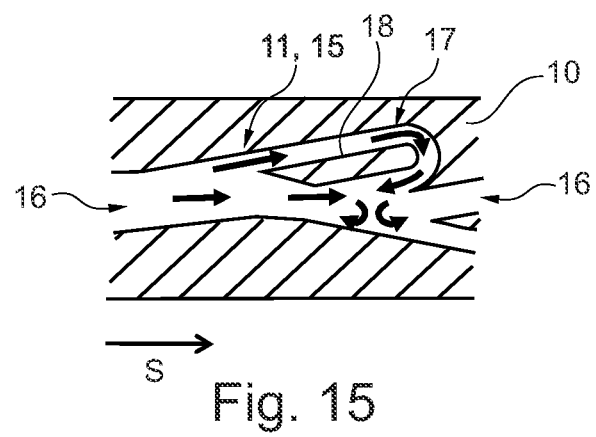
Figure 16:
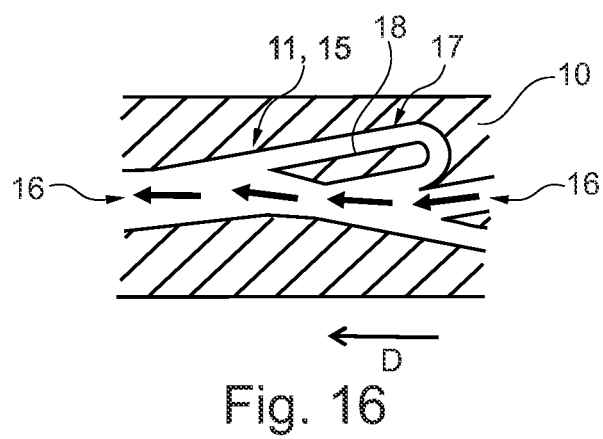

FIG. 13 shows a schematic cross-sectional illustration of part of the tool element 10, having a rectifier portion 15 which forms part of the first cooling duct 11. The rectifier portion 15, which is configured in the manner of a Tesla valve, here is illustrated so as to be overall elongated; however, the rectifier portion 15 could also be configured so as to be bent, for example, wherein the structure described hereunder can be maintained in a modified form. An almost straight continuous primary portion 16 as well as a plurality of counterflow portions 17, which in an alternating manner are disposed on both sides of the primary portion 16, can be identified within the rectifier portion 15. FIGS. 14 to 16 show in each case a detail from FIG. 13, having a single counterflow portion 17. The latter, when viewed in a blocking direction S, branches off from the primary portion 16 at an acute angle a and opens into the primary portion 16 again at an obtuse angle 13. The counterflow portion 17 here is delimited by a guiding element 18 which has been produced in the course of the additive manufacturing of the tool element 10, on the one hand. The guiding element 18 is disposed on the primary portion 16 and, when viewed in the blocking direction S, runs from the center of the primary portion 16 toward the outside. If cooling liquid flows in the blocking direction S through the rectifier portion 15, as is illustrated in FIG. 15, the coolant flow is split by the guiding element 18, whereby a part flows through the counterflow portion 17, as a result of which imparting a reversal of direction, and in the opposite direction finally meets the coolant flow in the primary portion 16. Substantial turbulences which render a laminar flow impossible arise here. The effect is substantially reinforced in that a plurality of counterflow portions 17 and associated guiding elements 18 are disposed in succession, as is illustrated in FIG. 13. However, if cooling liquid is directed through the rectifier portion 15 in a passing direction D, counter to the blocking direction S, a coolant flow through the substantially straight primary portion 16 is almost exclusively configured, while the flow in those counterflow portions 17 is negligible. An at least largely laminar flow can thus be configured under certain circumstances. The rectifier portion 15 in the blocking direction S thus has a substantially higher flow resistance to the cooling liquid than in the passing direction D. In the exemplary forms illustrated, the difference can correspond to a factor between 10 and 100, for example.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method of manufacturing a tool part of a forming tool, the method comprising:
   forming a tool element of the tool part having a shape-imparting operating face and at least one first cooling duct for cooling a liquid by additive manufacturing; and
   inserting the tool element into a recess of a base element of the tool part such that the at least one first cooling duct is fluidly connected to a second cooling duct formed within the base element,
   wherein the at least one first cooling duct has at least one rectifier portion including a blocking direction and an opposing passing direction, cooling liquid flowing through the at least one first cooling duct in the blocking direction has a higher flow resistance than cooling liquid flow through the at least one first cooling duct in the passing direction.

2. The method of claim 1, wherein the at least one rectifier portion has a primary portion and a counterflow portion, the counterflow portion branches off from the primary portion at an angle of less than 90 degrees in the blocking direction and opens into the primary portion at an angle of more than 90 degrees in the passing direction.

3. The method of claim 1, wherein the at least one rectifier portion has a primary portion and at least one rigid guiding element, the at least one rigid guiding element is inclined in the passing direction and extends toward a center of the primary portion.

4. The method of claim 1, wherein the step of forming the tool element by the additive manufacturing includes forming a plurality of clearances within the tool element, the plurality of clearances are spaced apart from each first cooling duct.

5. The method of claim 1, wherein the recess is P formed in the base element by subtractive machining.

6. The method of claim 1, wherein the second cooling duct is formed in the base element by subtractive machining prior to insertion of the tool element.

7. The method of claim 1, wherein the tool element in a region of the shape-imparting operating face is made from a harder material than that of the base element.

8. The method of claim 1, wherein the step of forming the tool element by the additive manufacturing includes forming a groove surrounding a connecting opening at an end of the first cooling duct for connecting to the second cooling duct, further comprising inserting an elastic sealing element into the groove prior to inserting the tool element into the recess.

9. The method of claim 1, wherein the tool element includes a plurality of regions, two of the plurality of regions are made of different materials.

10. A method of manufacturing a tool part of a forming tool, the method comprising: forming a tool element of the tool part having a shape-imparting operating face and at least one first cooling duct for cooling a liquid by additive manufacturing; forming a base element of the tool part having a recess and a second cooling duct by subtractive machining; and inserting the tool element into the recess of the base element such that the at least one first cooling duct is fluidly connected to the second cooling duct, the second cooling duct is formed in the base element prior to inserting the tool element into the recess, wherein the at least one first cooling duct has at least one rectifier portion including a blocking direction and an opposing passing direction, cooling liquid flow through the at least one first cooling duct in the blocking direction has a higher flow resistance than cooling liquid flow through the at least one first cooling duct in the passing direction.

11. The method of claim 10, wherein the at least one rectifier portion has a primary portion and a counterflow portion, the counterflow portion branches off from the primary portion at an angle of less than 90 degrees in the blocking direction and opens into the primary portion at an angle of more than 90 degrees in the passing direction.

12. The method of claim 10, wherein the at least one rectifier portion has a primary portion and at least one rigid guiding element, the at least one rigid guiding element is inclined in the passing direction and extends toward a center of the primary portion.

13. The method of claim 10, wherein the step of forming the tool element by the additive manufacturing includes forming a plurality of clearances within the tool element, the plurality of clearances are spaced apart from each first cooling duct.

14. The method of claim 10, wherein the step of forming the tool element by the additive manufacturing includes forming a groove surrounding a connecting opening at an end of the first cooling duct for connecting to the second cooling duct, further comprising inserting an elastic sealing element into the groove prior to inserting the tool element into the recess.

* * * * *